Nov. 2, 1926. 1,605,693
N. P. ALBERTSON
END GATE FOR WAGONS
Filed June 15, 1925
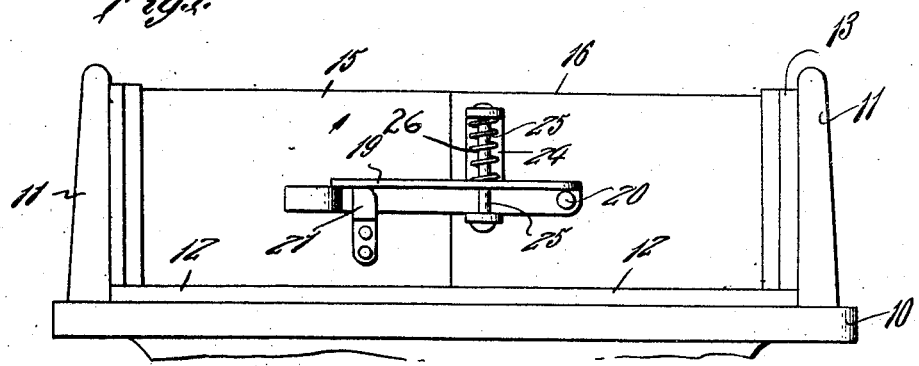
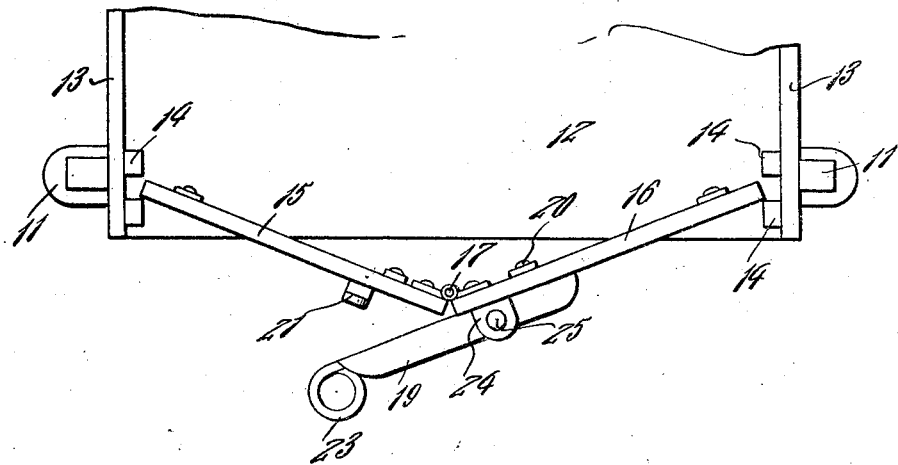
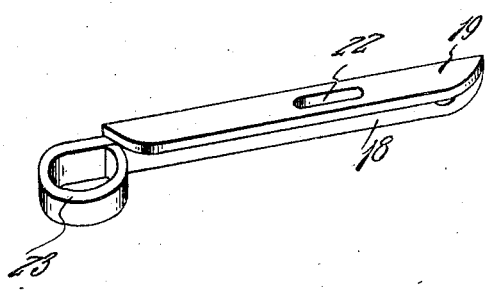
N. P. Albertson
INVENTOR
BY Victor J. Evans
ATTORNEY Patented Nov. 2, 1926.

1,605,693

UNITED STATES PATENT OFFICE.

NELS PETER ALBERTSON, OF GLOVER, NORTH DAKOTA, ASSIGNOR TO WESTERN MANUFACTURING COMPANY, A CORPORATION OF NORTH DAKOTA.

END GATE FOR WAGONS.

Application filed June 15, 1925. Serial No. 37,380.

This invention relates to improvements in endgates for wagons and contemplates the provision of a sectional gate which may be folded upon itself in order that the same may become disengaged from the side walls of the wagon box in order that the same may be readily and easily removed therefrom.

Another object of the invention is the provision of means included on the outer sides thereof whereby the same may be held in an extended locked position and held firmly against the side walls of the wagon box.

A further object of the invention is the provision of compression means included on a locking bar secured on the outer side thereof whereby the sections of the endgate may be held in an extended position and held against accidental displacement from the inner side walls of the wagon box.

With the above and other objects in view, the invention further includes the following novel features and details of construction, to be hereinafter more fully described, illustrated in the accompanying drawing and pointed out in the appended claim.

In the drawing:

Figure 1 is an end elevation of a wagon box showing the endgate positioned thereon.

Figure 2 is a top plan view of a section of a wagon box and showing the end gate sections partially folded and the locking means disengaged from the other section thereof and about to be removed from the wagon box.

Figure 3 is a detailed perspective of the locking means per se.

Referring to the drawing in detail, wherein like characters of reference denote corresponding parts, the reference character 10 indicates a bolster of a wagon, not shown, which includes standards 11 arranged vertically adjacent the outer end portions thereof. Resting upon the upper face of the bolster 10 is a wagon box bottom 12 which includes side boards or panels which are fitted between and lie flush with the inner side walls of the standards 11 in order that the wagon box per se may be held rigidly therebetween substantially as set forth. These side boards or panels 13 have provided upon the inner sides thereof and adjacent the outer end portions thereof, pairs of spaced parallel vertically extending blocks 14, the purpose of which will be presently apparent.

In the present invention, there is provided a pair of panel members 15 and 16 which have their inner end portions pivotally secured or hingedly associated as at 17 in order that the said panels 15 and 16 may be folded upon themselves. As clearly illustrated in Figure 1 of the drawing, the panels 15 and 16 are in their extended positions and have their opposite end portions received between the blocks 14 provided upon the inner sides of the side boards or panels 13 in order to hold all the articles contained within the wagon and prevent the same from falling or sliding out of the outer end or rear end of the wagon.

In order to provide a suitable locking means for these panels 15 and 16 which in combination form the end gate per se, I provide a lever which is constructed of relatively flat material and includes a vertically extending portion 18 and a transversely disposed portion 19, this lever is substantially L-shaped in cross section; one end of the portion 18 is pivotally secured as at 20 to the panel 16 while the opposite end portion is received within a bracket 21 provided upon the outer face of the panel 15 in order that the panels 15 and 16 respectively may be held firmly in their extended positions. The transversely disposed portion 19 of the lever is longitudinally slotted as at 22 and the outer end portion of the portion 18 is looped as at 23 in order to provide a suitable hand hold in order to facilitate the operation of the same.

Owing to shocks and jars experienced in driving wagons and the like over rough roads it will be noted that especially when the wagon is empty and when the wagon enters a rut or the like that the said lever may accidentally become disengaged from the bracket 21 on the outer face of the panel 15, and in order to prevent this accidental displacement of the lever from within the bracket 21 I provide a substantially U-shaped bracket member 24 which has its lower face secured to the rear face of the panel 16 and which has its spaced parallel legs extending outwardly and in registration thereon. A bolt 25 extends through the parallel legs of the substantially U-shaped bracket 24 and through the longitudinally extending slotted portion 22 provided in the transversely extending portion 19 of the lever, this bolt 25 is encircled by a compression spring 26 which has one end portion lying flush with the under side of the upper leg of the bracket 24 and its lower portion resting upon the upper side of the transversely extending portion 19 of the lever in order that the said lever is kept within the bracket 21 provided upon the outer side or rear wall of the panel 15 and held against accidental displacement therein.

It will thus be seen that upon lifting upwardly upon the hand hold portion 23 of the lever that the vertically extending portion 18 thereof will become disengaged from the bracket 21 provided upon the rear face or wall of the panel 15 and upon subsequent pulling rearwardly on the looped portion 23 of the lever, the panels 15 and 16 will begin to fold upon themselves as clearly illustrated in Figure 2 of the drawing in order that the wagon box formed by the two panels 15 and 16 may be readily and easily removed from the wagon box.

The invention is susceptible of various changes in its form, proportions and minor details of construction, and the right is herein reserved to make such changes as properly fall within the scope of the appended claim.

Having thus described my invention what is claimed is:

An endgate for use upon wagons including a pair of panels having their inner end portions hingedly associated, an angularly shaped operating lever having one end portion pivotally secured to one of the panels and including a longitudinally disposed slot in the upper portion thereof, a substantially offset bracket member provided upon the opposite panel and receiving the corresponding end portion of the operating lever therein, a substantially U-shaped bracket secured to the first mentioned panel and having a bolt extending through the legs and longitudinally disposed slot provided in the upper portion of the operating lever, and a compression spring interposed between the upper side of the operating lever and corresponding leg of the substantially U-shaped bracket for holding said operating lever against accidental displacement within the substantially offset bracket member and permitting an upward swinging movement to the operating lever.

In testimony whereof I affix my signature.

NELS PETER ALBERTSON.